No. 756,899. PATENTED APR. 12, 1904.
M. A. SCHAFER.
VEHICLE BRAKE.
APPLICATION FILED JAN. 28, 1904.

NO MODEL.

Witnesses:
Arthur Junger
William Schulz

Inventor:
Marcus Augustus Schafer
by Frank R. Piesen Atty.

THE NORRIS PETERS CO., PHOTO-LITHO., WASHINGTON, D. C.

No. 756,899. Patented April 12, 1904.

UNITED STATES PATENT OFFICE.

MARCUS AUGUSTUS SCHAFER, OF NEW YORK, N. Y.

VEHICLE-BRAKE.

SPECIFICATION forming part of Letters Patent No. 756,899, dated April 12, 1904.

Application filed January 28, 1904. Serial No. 190,920. (No model.)

*To all whom it may concern:*

Be it known that I, MARCUS AUGUSTUS SCHAFER, a citizen of the United States, residing at New York city, Richmond, county of Richmond, and State of New York, have invented new and useful Improvements in Vehicle-Brakes, of which the following is a specification.

This invention relates to a vehicle-brake, which is so constructed that the brake-shoe may be projected between two of the wheel-spokes, so that the vehicle when braked cannot be accidentally started.

Figure 1:
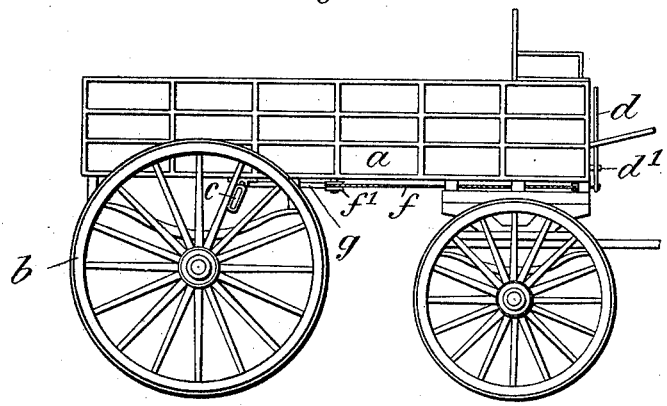
Figure 2:
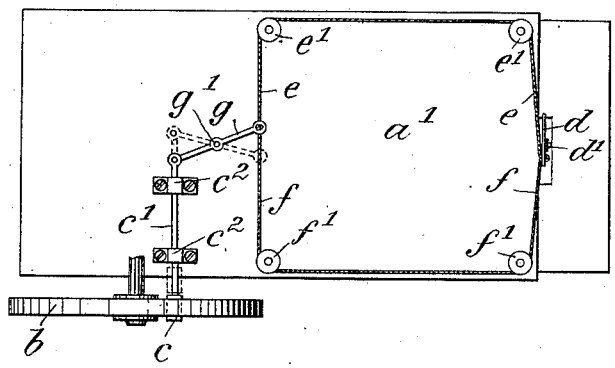
Figure 3:
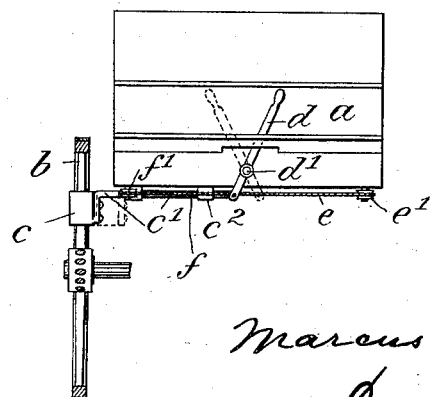

In the accompanying drawings, Figure 1 is a side elevation of a wagon provided with my improved brake; Fig. 2, a bottom view of the wagon-body, showing the brake-operating mechanism; and Fig. 3, a front view of the wagon-body and brake, showing the wheel in section.

The letter $a$ represents the body of the wagon or other vehicle, to the wheel $b$ of which the brake is adapted to be applied. The construction of the brake is such that it may be projected laterally between two of the spokes of wheel $b$, so that the further rotation of the latter is prevented. To effect this result, the brake-shoe $c$, preferably covered with rubber, is mounted upon the end of a transverse slide $c'$, movable at right angles to the wagon-body. The slide $c'$ is guided in bearings $c^2$, secured to the bottom $a'$ of the wagon-body. The relative position of wheel and brake-shoe is such that when the shoe is projected outwardly beyond the side of the wagon-body it will enter between two of the spokes of wheel $b$. When drawn inwardly, the brake will be withdrawn from the wheel and liberate the same.

The brake is operated by a two-arm brake-lever $d$, fulcrumed at $d'$. To the lower arm of lever $d$ are secured two brake chains or ropes $e\,f$, extending in opposite directions and guided along the bottom $a'$ by pulleys $e'\ f'$, respectively. At their rear ends the ropes $e\,f$ are connected to one end of a lever $g$, fulcrumed at $g'$, and connected at its other end to the slide $c'$.

It will be seen that by properly manipulating the brake-lever the shoe may be readily put on or taken off. The brake is particularly designed to prevent vehicles at rest from being accidentally started or from sliding down-grade. It may, however, also be applied to vehicles in slow motion.

What I claim is—

The combination of a wheeled vehicle with a brake-lever, a pair of ropes secured thereto, a lever connected to the ropes, a laterally-movable slide connected to the lever, and a brake-shoe secured to the slide and adapted to be projected between the wheel-spokes, substantially as specified.

Signed by me at New York city, Manhattan, New York, this 27th day of January, 1904.

MARCUS AUGUSTUS SCHAFER.

Witnesses:
WILLIAM SCHULZ,
FRANK V. BRIESEN.